US005592154A

United States Patent [19]
Lin et al.

[11] Patent Number: 5,592,154
[45] Date of Patent: Jan. 7, 1997

[54] METHOD AND APPARATUS FOR PRIORITIZING COMMUNICATIONS IN A TWO-WAY COMMUNICATION SYSTEM

[75] Inventors: Jyh-Han Lin, Ft. Worth, Tex.; Zhonghe Wang, Lake Worth, Fla.

[73] Assignee: Motorola, Inc., Schaumburg, Ill.

[21] Appl. No.: 463,114

[22] Filed: Jun. 5, 1995

[51] Int. Cl.⁶ .......................... G08B 5/22; H04M 11/00; H04Q 7/00

[52] U.S. Cl. .................... 340/825.5; 340/825.44; 379/57; 379/60; 455/33.2; 455/38.2

[58] Field of Search .................. 340/825.44, 825.49, 340/825.5, 825.36; 379/57, 59, 60, 63; 455/33.2, 38.2

[56] References Cited

U.S. PATENT DOCUMENTS

| 4,875,038 | 10/1989 | Siwiak et al. | 340/825.44 |
|---|---|---|---|
| 4,959,648 | 9/1990 | Breeden et al. | 340/825.44 |
| 5,390,234 | 2/1995 | Bar-Noy et al. | 379/59 |
| 5,408,683 | 4/1995 | Ablay et al. | 379/59 |
| 5,455,851 | 10/1995 | Chaco et al. | 340/825.49 |
| 5,463,382 | 10/1995 | Nikas et al. | 340/825.44 |
| 5,475,863 | 12/1995 | Simpson et al. | 379/59 |
| 5,519,758 | 5/1996 | Tabbane | 455/33.2 |
| 5,542,136 | 6/1996 | Bar-Noy et al. | 379/59 |

*Primary Examiner*—Michael Horabik
*Assistant Examiner*—Edward Merz
*Attorney, Agent, or Firm*—Charles W. Bethards

[57] ABSTRACT

A method and apparatus prioritize communications in a two-way communication system (102, 104) serving portable subscriber units (122) in a coverage area (500). A fixed portion (102) of the two-way communication system (102, 104) requests (904) location information (824, 224, 826) from a subset of the portable subscriber units (122) in response to having a need to communicate therewith, and then receives (906) the location information (824, 224, 826) from the subset of the portable subscriber units (122). The location information (824, 224, 826) includes mobility index values (826) determined by the subset of the portable subscriber units (122) for indicating mobility of each portable subscriber unit (122). The fixed portion (102) then prioritizes (908) the communications based upon the mobility index values (826).

16 Claims, 8 Drawing Sheets

METHOD AND APPARATUS FOR PRIORITIZING COMMUNICATIONS IN A TWO-WAY COMMUNICATION SYSTEM

FIELD OF THE INVENTION

This invention relates in general to radio communication systems, and more specifically to a method and apparatus for prioritizing communications in a two-way communication system.

BACKGROUND OF THE INVENTION

In a two-way communication system, and particularly in a two-way messaging system, it is possible during periods of high system traffic for a message to be delayed too long for the message to be delivered to a subscriber unit on the move. The reason is due to the fact that such systems preferably must locate the subscriber unit and then transmit the message in an appropriate region of the coverage area, the appropriate region being a portion of the coverage area in which the subscriber unit was located. Such regional transmission advantageously allows frequency reuse for improved radio frequency spectrum efficiency. If the subscriber unit is moving rapidly, however, then system traffic delays can allow the subscriber unit to move out of the appropriate region before a message scheduled for transmission to the subscriber unit is sent, thereby causing the message to be missed.

Thus what is needed is a method and apparatus for prioritizing the communication of the messages such that a subscriber unit having a high mobility will be more likely to receive its scheduled messages before moving out of the region in which the subscriber unit was located by the system.

SUMMARY OF THE INVENTION

An aspect of the present invention is a method for prioritizing communications in a two-way communication system serving a plurality of portable subscriber units in a coverage area. The method comprises in a fixed portion of the two-way communication system the steps of requesting location information from a subset of the plurality of portable subscriber units in response to having a need to communicate therewith, and receiving the location information from the subset of the plurality of portable subscriber units. The location information includes a plurality of mobility index values determined by the subset of the plurality of portable subscriber units for indicating mobility of each portable subscriber unit. The method further comprises the step of prioritizing the communications based upon the plurality of mobility index values.

Another aspect of the present invention is a controller in a fixed portion of a two-way communication system for prioritizing communications therein. The two-way communication system serves a plurality of portable subscriber units in a coverage area. The controller comprises a processor for directing operation of the controller, and a telephone interface coupled to the processor for interfacing the two-way communication system with a telephone system. The controller further comprises a memory coupled to the controller for queuing the communications for the plurality of portable subscriber units, and a transmitter interface coupled to the processor for requesting location information from a subset of the plurality of portable subscriber units in response to having a need to communicate therewith. The controller also includes a receiver interface coupled to the processor for receiving the location information from the subset of the plurality of portable subscriber units. The location information includes a plurality of mobility index values determined by the subset of the plurality of portable subscriber units for indicating mobility of each portable subscriber unit. In addition, the controller comprises a prioritization element coupled to the processor for prioritizing the communications based upon the plurality of mobility index values.

Another aspect of the present invention is a portable subscriber unit for use in a two-way communication system for prioritizing communications therein. The portable subscriber unit is served in a coverage area partitioned into a plurality of coverage regions, a coverage region identified by a region identifier transmitted periodically within the coverage region. The portable subscriber unit comprises a receiver for receiving over time a plurality of transmissions of the region identifier from a fixed portion of the two-way communication system, and a processor coupled to the receiver for decoding the plurality of transmissions of the region identifier and for controlling the portable subscriber unit in response thereto. The portable subscriber unit further comprises a memory coupled to the processor for storing information decoded from the plurality of transmissions of the region identifier, and user controls coupled to the processor for providing control of the portable subscriber unit by a user. The portable subscriber unit also includes a mobility index determination element coupled to the processor for determining from the plurality of transmissions of the region identifier a mobility index value for the portable subscriber unit. The mobility index value is indicative of a rate of change of the region identifier and thus also indicative of subscriber unit mobility.

DESCRIPTION OF THE PREFERRED EMBODIMENT

Figure 1:
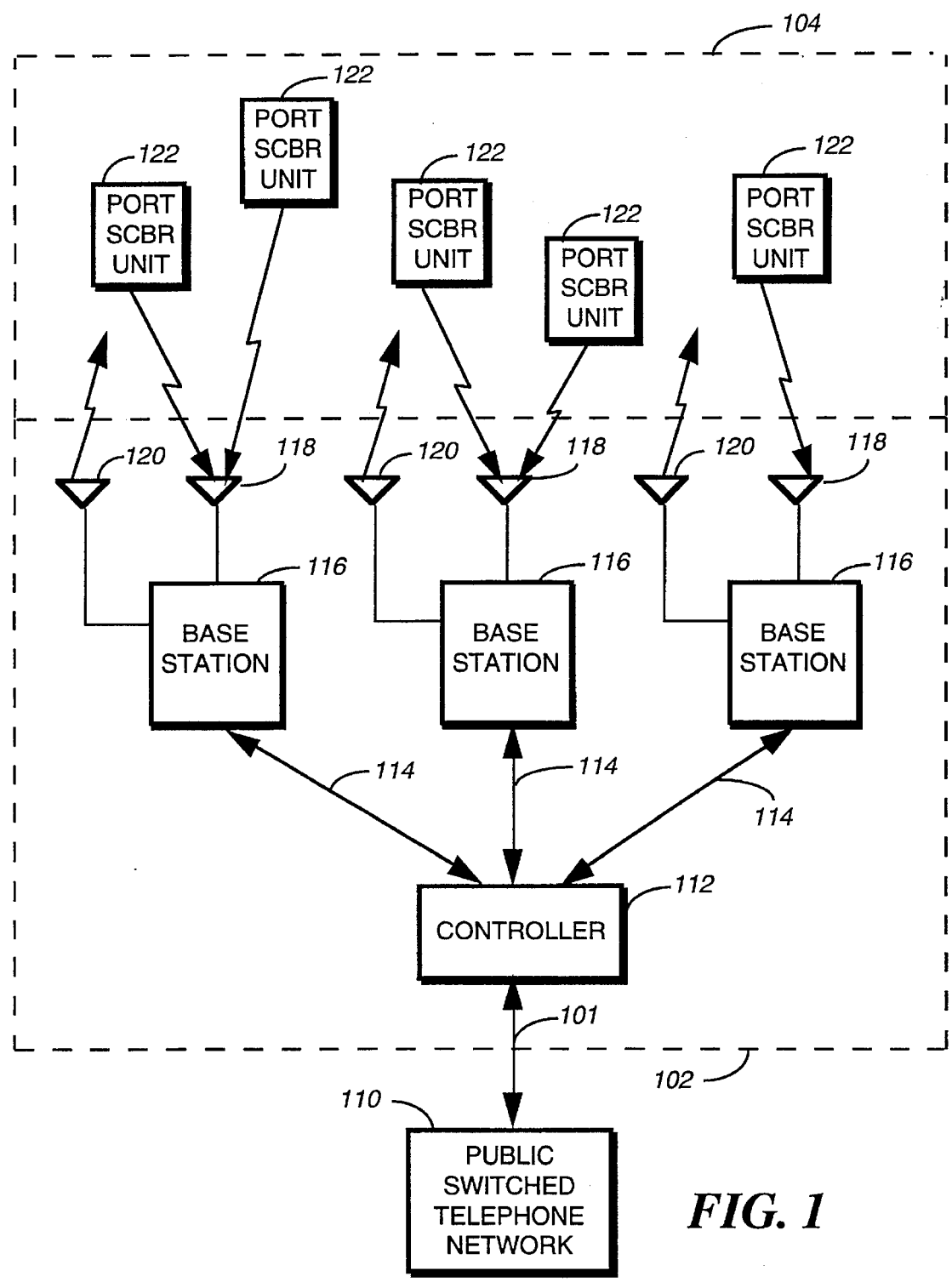
FIG. 1 is an electrical block diagram of a communication system in accordance with the preferred embodiment of the present invention.

Referring to FIG. 1, an electrical block diagram of a communication system in accordance with the preferred embodiment of the present invention comprises a fixed portion 102 and a portable portion 104. The fixed portion 102 comprises a plurality of conventional base transceivers which are base stations 116 coupled by communication links 114 to a controller 112 for controlling the base stations 116. The hardware of the controller 112 is preferably similar to the Wireless Messaging Gateway (WMG™) Administrator! paging control center manufactured by Motorola, Inc. of Schaumburg, Ill. The hardware of the base stations 116 is preferably similar to the Nucleus™ Orchestra! manufactured by Motorola, Inc. of Schaumburg, Ill. Other similar controller hardware can be utilized as well for the controller 112 and base stations 116. The controller 112 comprises a plurality of firmware elements in accordance with the preferred embodiment of the present invention, as will be described further below.

Each of the base stations 116 transmits radio signals to the portable portion 104 comprising a plurality of portable subscriber units 122 via a transmitting antenna 120. The base stations 116 each receive radio signals from the plurality of portable subscriber units 122 via a receiving antenna 118. The radio signals comprise selective call addresses and messages transmitted to the portable subscriber units 122 and acknowledgments received from the portable subscriber units 122. It will be appreciated that the portable subscriber units 122 can also originate messages other than acknowledgments. The controller 112 preferably is coupled by telephone links 101 to the public switched telephone network (PSTN) 110 for receiving selective call originations therefrom. Selective call originations comprising voice and data messages from the PSTN 110 can be generated, for example, from a conventional telephone coupled to the PSTN 110 in a manner that is well known in the art.

Data and control transmissions between the base stations 116 and the portable subscriber units 122 preferably utilize a well-known digital selective call signaling protocol, such as the Motorola FLEX™ family of protocols. It will be appreciated that other similar protocols can be utilized as well. These protocols utilize well-known error detection and error correction techniques and are therefore tolerant to bit errors occurring during transmission, provided that the bit errors are not too numerous in any one code word.

Outbound channel transmissions comprising data and control signals from the base stations 116 preferably utilize two- and four-level frequency shift keyed (FSK) modulation, operating at sixteen-hundred or thirty-two-hundred symbols-per-second (sps), depending on traffic requirements and system transmission gain. Inbound channel transmissions from the portable subscriber units 122 to the base stations 116 preferably utilize four-level FSK modulation at a rate of ninety-six-hundred bits per second (bps). Inbound channel transmissions preferably occur during predetermined data packet time slots synchronized with the outbound channel transmissions. It will be appreciated that, alternatively, other signaling protocols, modulation schemes, and transmission rates can be utilized as well for either or both transmission directions. The outbound and inbound channels preferably operate on a single carrier frequency utilizing well-known time division duplex (TDD) techniques for sharing the frequency. It will be appreciated that, alternatively, frequency division duplex (FDD) can be utilized as well for the outbound and inbound channels.

U.S. Pat. No. 4,875,038 to Siwiak et al., which describes a prior art acknowledge-back selective call communication system, is hereby incorporated herein by reference. For further information on the operation and structure of an acknowledge-back selective call communication system, please refer to the Siwiak et al. patent.

Figure 2:
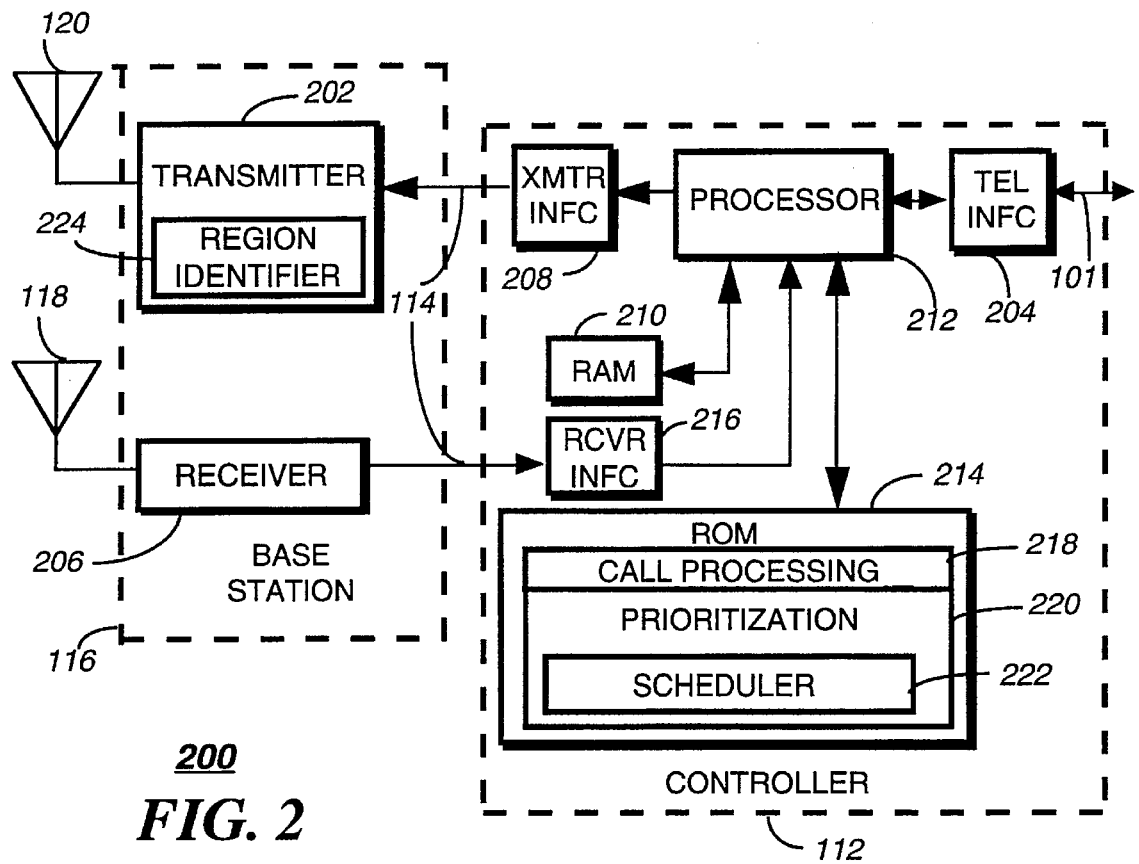
FIG. 2 is an electrical block diagram of portions of a controller and base station in accordance with the preferred embodiment of the present invention.

Referring to FIG. 2, an electrical block diagram 200 of portions of the controller 112 and base station 116 in accordance with the preferred embodiment of the present invention shows that the controller 112 comprises a processor 212 for directing operation of the controller 112. The processor 212 preferably is coupled through a transmitter interface 208 to a transmitter 202, both utilizing conventional techniques well known in the art. The transmitter 202 preferably transmits two- and four-level FSK data messages to the portable subscriber units 122. Also preferably, the transmitter 202 comprises a region identifier 224 stored within a non-volatile memory thereof for identifying a coverage region in which the transmitter operates. The region identifier 224 is preferably a non-zero value unique to the region in which the transmitter 202 is located. It will be appreciated that, alternatively, the region identifier 224 can be stored in the controller 112 and selectively communicated to the transmitter 202 along with other information to be transmitted therefrom.

The processor 212 is also coupled through a conventional receiver interface 216 to at least one acknowledgment receiver 206 using conventional binary FSK demodulation. The acknowledgment receiver 206 can be collocated with the base stations 116, as implied in FIG. 2, but preferably is positioned remote from the base stations 116 to avoid interference from the transmitter 202. The acknowledgment receiver 206 is for receiving one or more acknowledgments from the plurality of portable subscriber units 122. In addition, the processor 212 is coupled through a telephone interface 204 to the telephone links 101 and thence to the PSTN 110 for receiving message originations therefrom.

The processor 212 is coupled to a random access memory (RAM) 210 for storing messages to be transmitted to the portable subscriber units 122, and for storing messages received from the portable subscriber units 122. The processor 212 also is coupled to a read-only memory (ROM) 214 comprising firmware elements for use by the processor 212. It will be appreciated that other types of memory, e.g., electrically erasable programmable ROM (EEPROM) or magnetic disk memory, can be utilized as well for the ROM 214 or RAM 210. It will be further appreciated that the RAM 210 and the ROM 214, singly or in combination, can be integrated as a contiguous portion of the processor 212. Preferably, the processor 212 is similar to the DSP56100 digital signal processor (DSP) manufactured by Motorola, Inc. of Schaumburg, Ill. It will be appreciated that other similar processors can be utilized as well for the processor 212, and that additional processors of the same or alternative type can be added as required to handle the processing requirements of the controller 112.

The firmware elements of the controller 112 comprise a call processing element 218 for processing calls in a manner well known in the art. The firmware elements further comprise a prioritization element 220 and a scheduler element 222 in accordance with the preferred embodiment of the present invention. The prioritization element is for prioritizing communications handled by the communication system 102, 104 based upon a plurality of mobility index values received from the portable subscriber units, as will be explained in detail further below. The scheduler element 222 is for scheduling the communications in an order determined by the plurality of mobility index values, communications with the portable subscriber units 122 having mobility index values indicative of higher subscriber unit mobility being scheduled first.

Figure 3:
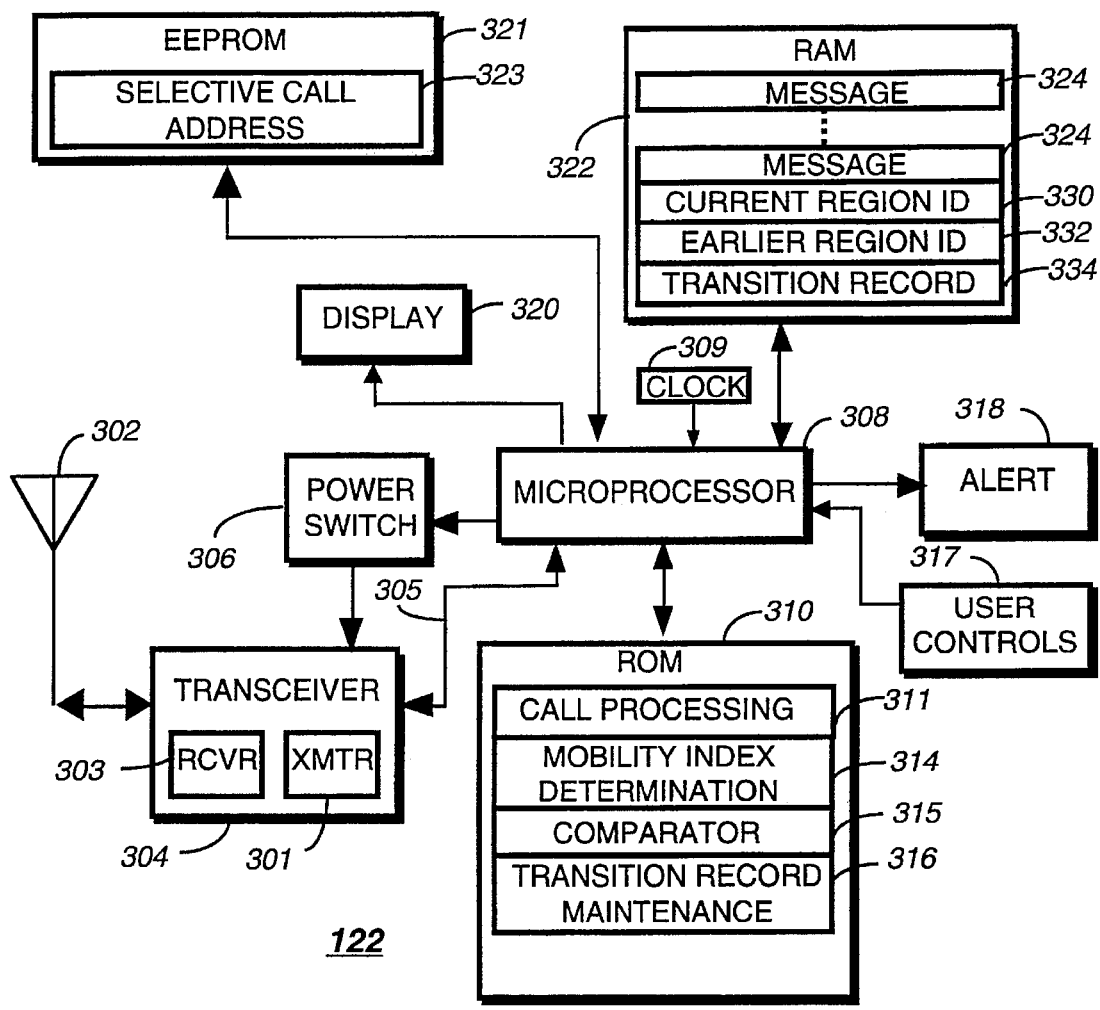
FIG. 3 is an electrical block diagram of a portable subscriber unit in accordance with the preferred embodiment of the present invention.

Referring to FIG. 3, an electrical block diagram of the portable subscriber unit 122 in accordance with the preferred embodiment of the present invention comprises a transceiver antenna 302 for transmitting and intercepting radio signals to and from the base stations 116, respectively. The radio signals linked to the transceiver antenna 302 are coupled to a transceiver 304 comprising a conventional transmitter 301 and receiver 303. The radio signals received from the base stations 116 use conventional two and four-level FSK. It will be appreciated by one of ordinary skill in the art that the transceiver antenna 302 is not limited to a single antenna for transmitting and receiving radio signals. Separate antennas for receiving and transmitting radio signals would also be suitable.

Radio signals received by the transceiver 304 produce demodulated information at the output. The demodulated information is transferred over a signal information bus 305 which is coupled to the input of a microprocessor 308, which processes the information in a manner well known in the art. Similarly, acknowledge response messages are processed by the microprocessor 308 and delivered through the signal information bus 305 to the transceiver 304. The acknowledge response messages transmitted by the transceiver 304 are preferably modulated using four-level FSK operating at a bit rate of ninety-six-hundred bps. It will be appreciated that, alternatively, other bit rates and other types of modulation can be used as well.

A conventional power switch 306, coupled to the microprocessor 308, is used to control the supply of power to the transceiver 304, thereby providing a battery saving function. The microprocessor 308 is coupled to a clock 309 for keeping track of the timing of various events as required in accordance with the present invention. The microprocessor 308 also is coupled to a random access memory (RAM) 322 for storing messages in a message storage location 324 and a current region identifier 330 corresponding to the region identifier 224 currently received from the fixed portion of the communication system. The RAM 322 also stores an earlier region identifier 332 corresponding to the region identifier 224 received earlier, e.g., in a predetermined earlier frame, from the fixed portion. Each time another region identifier 224 is received and decoded, the microprocessor 308 updates the current region identifier 330 with the newly received region identifier 224, and then compares the updated current region identifier 330 with the earlier region identifier 332 to determine whether a region identifier transition has occurred. A region identifier transition is defined to have occurred whenever the current region identifier 330 is different from the earlier region identifier 332. After the comparison is made, the microprocessor 308 replaces the earlier region identifier 332 with the updated current region identifier 330 to be ready for a next comparison. In addition, the RAM 322 stores a transition record 334 corresponding to N recently received transmissions of the region identifier, where N is a predetermined positive integer, e.g., thirty-two. The transition record 334 includes an indicator, e.g., a bit, corresponding to each of the N recently received transmissions for indicating region identifier transition status, the indicator selected from a positive indicator, e.g., a one, for indicating that a region identifier transition has occurred, and a negative indicator, e.g., a zero, for indicating that a region identifier transition has not occurred. It will be appreciated that N+1 transmissions must be compared in order to determine N indicators of transition status.

The microprocessor 308 is also coupled to an electrically erasable programmable read only memory (EEPROM) 321 which comprises at least one selective call address 323 assigned to the portable subscriber unit The microprocessor 308 also is coupled to a read-only memory (ROM) 310 comprising firmware elements for use by the microprocessor 308. It will be appreciated that other types of memory, e.g., EEPROM, can be utilized as well for the ROM 310 or RAM 322.

The firmware elements comprise a call processing element 311 for handling of incoming messages on the outbound channel using techniques well known in the art. When an address is received by the microprocessor 308, the call processing element 311 compares the received address with the at least one selective call address 323, and when a match is detected, a call alerting signal is generated to alert a user that a message has been received. The call alerting signal is directed to a conventional audible or tactile alert device 318 coupled to the microprocessor 308 for generating an audible or tactile call alerting signal. In addition, the call processing element 311 processes the message which preferably is received in a digitized conventional manner, and then stores the message in the message storage location 324 in the RAM 322. The message can be accessed by the user through conventional user controls 317 coupled to the microprocessor 308, for providing functions such as reading, locking, and deleting a message. For reading a message a display 320, e.g., a conventional liquid crystal display (LCD), preferably also is coupled to the microprocessor 308.

The firmware elements further comprise a mobility index determination element 314 for determining a mobility index value for the portable subscriber unit 122 in accordance with the preferred embodiment of the present invention. The mobility index value is determined from a plurality of transmissions of the region identifier 224 and is indicative of a rate of change of the region identifier 224 and thus also is indicative of mobility of the portable subscriber unit 122. The firmware elements also include a comparator element 315 for comparing the region identifier 224 received in a current transmission of the plurality of transmissions with the region identifier received in an earlier transmission to determine whether a region identifier transition has occurred. The region identifier transition is defined to have occurred whenever the region identifier 224 received in the current transmission is different from the region identifier 224 received in the earlier transmission. In addition, the firmware elements include a transition record maintenance element 316 for maintaining the transition record 334 corresponding to N recently received transmissions of the region identifier, where N is a predetermined positive integer. Preferably, the transition record includes an indicator (a bit) corresponding to each of the N recently received transmissions. Preferably, the indicator is selected from a positive indicator (1) for indicating that a region identifier transition occurred with the corresponding transmission, and a negative indicator (0) for indicating that a region identifier transition did not occur.

Figure 4:
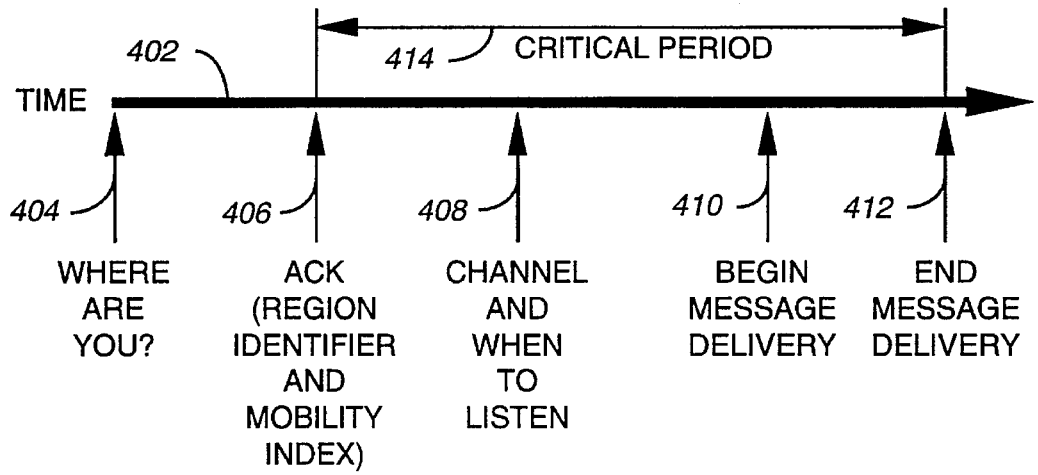
FIG. 4 is a timing diagram depicting events that occur in the communication system between message notification and message delivery.

Referring to FIG. 4, a timing diagram 400 depicts events that occur in the communication system 102, 104 between message notification and message delivery. The arrow 402 represents time. In response to the fixed portion 102 having received a message for the portable subscriber unit 122, the message notification begins with the fixed portion 102 transmitting a "where are you?" request 404 addressed to the portable subscriber unit 122 for which the message is intended. In response, the portable subscriber unit 122 returns an acknowledgment 406, comprising the current region identifier 330. Next, the fixed portion 102 sends a command 408 to the portable subscriber unit 122, advising a channel and a time to listen for the message. At the designated time the fixed portion begins 410 delivery of the message. The time between the acknowledgment 406 and the end 412 of the message delivery is known as the "critical period" 414. What makes this period critical is that the acknowledgment 406 contains the current region identifier 330, which will be used by the fixed portion 102 to determine which coverage region will be used for transmitting the message. If a highly mobile subscriber unit 122 moves to a different coverage region during the critical period, then the message can be missed. The concept of coverage regions is further demonstrated in FIG. 5.

Figure 5:
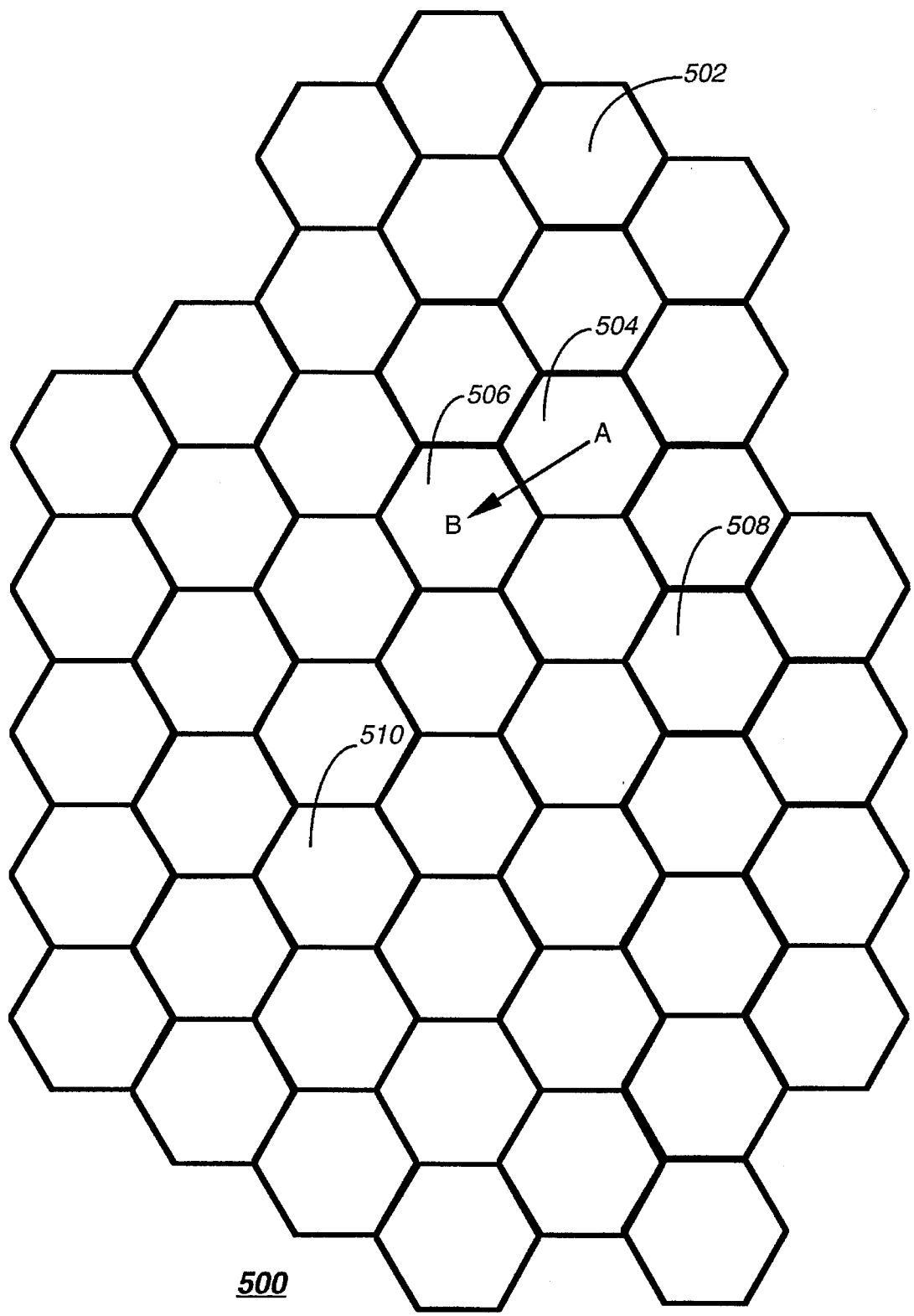
FIG. 5 depicts a coverage area partitioned into coverage regions in accordance with the preferred embodiment of the present invention.

Referring to FIG. 5, a coverage area 500 is partitioned into coverage regions 502–510 in accordance with the preferred embodiment of the present invention. The "where are you?" request 404 preferably is simulcast throughout the coverage area 500. After the subscriber unit 122 responds with the current region identifier 330, the fixed portion advantageously can communicate with the subscriber unit 122 by using only the base station(s) 116 of the coverage region 502–510 identified by the current region identifier 330, thereby allowing other communications to occur simultaneously on the same frequency in other coverage regions 502–510. For example, two different communications can occur simultaneously in the coverage regions 508 and 510 on the same channel.

While such frequency reuse is desirable from the standpoint of radio frequency spectrum efficiency, problems can arise with a highly mobile subscriber unit 122. Suppose, for example, that the subscriber unit 122 operating in the coverage region 504 at point "A" responds to the "where are you?" request 404 with the acknowledgment 406, comprising the current region identifier 330 for the coverage region 504. While waiting for the message delivery, the subscriber unit 122 moves out of the coverage region 504 to point "B" in the coverage region 506. When the message delivery begins, the message will be transmitted only in the coverage region 504. Thus the message will be missed by the subscriber unit 122.

To minimize the probability of missing a message in the manner described above, the inventors devised the concept of prioritizing messages in an order corresponding to the degree of mobility of the subscriber unit 122, wherein fast moving subscriber units 122 would receive a higher priority than slow moving subscriber units 122. All that was needed was a method and apparatus to determine and report the degree of mobility of the subscriber unit 122.

Figure 6:
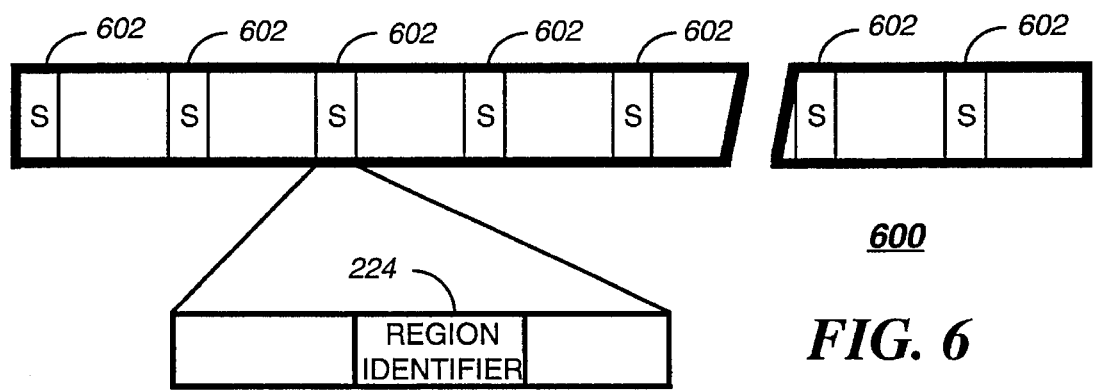
FIG. 6 is a timing diagram depicting a portion of the outbound protocol in accordance with the preferred embodiment of the present invention.

Referring to FIG. 6, a timing diagram depicts a portion of the outbound protocol 600 in accordance with the preferred embodiment of the present invention. The outbound protocol 600 preferably comprises a synchronization portion 602 which is periodically simulcast throughout the coverage area 500. The synchronization portion 602 comprises the region identifier 224, which preferably is locally unique to each coverage region 502–510. The inventors reasoned that by recording a recent history of the region identifiers 224 received by the subscriber unit 122, it would be possible to determine the degree of mobility of the subscriber unit 122, as explained herein below.

Figure 7:
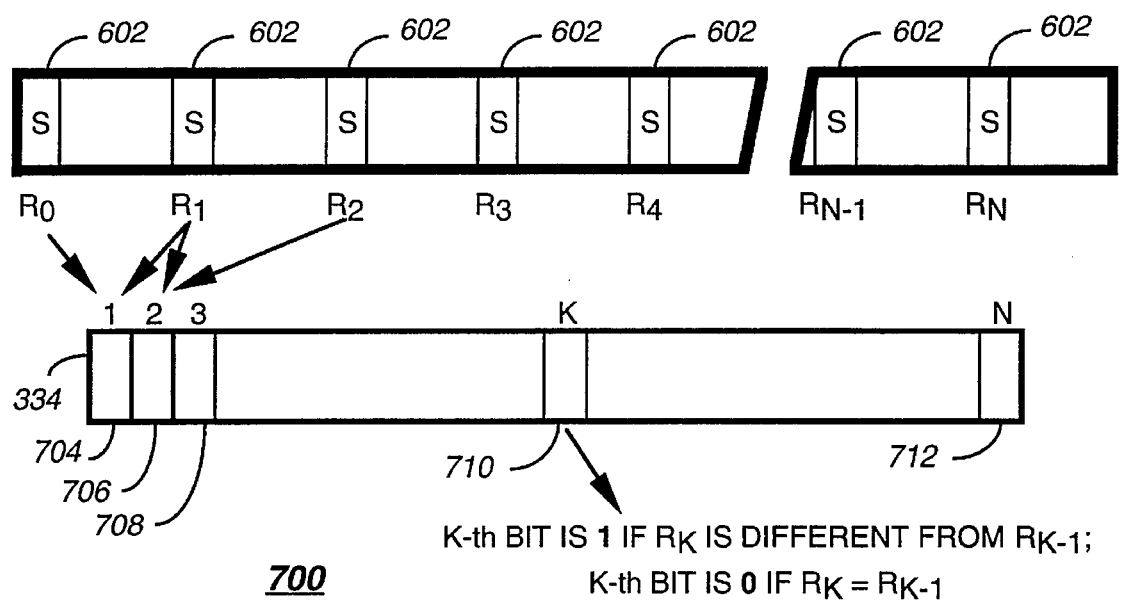
FIG. 7 is a bit diagram depicting an aspect of the outbound protocol as recorded in a transition record stored in the portable subscriber unit in accordance with the preferred embodiment of the present invention.

Referring to FIG. 7, a bit diagram 700 depicts an aspect of the outbound protocol 600 as recorded in the transition record 334 stored in the portable subscriber unit 122 in accordance with the preferred embodiment of the present invention. The region identifiers 224 received by the subscriber unit 122 over a period of time are identified as $R_O$-$R_N$ and are used to set the bits of the transition record 334. For example, when the region identifier $R_1$ is received, the first bit position 704 is set to 1 if $R_1$ is different from $R_0$, and is set to 0 if $R_1$ is the same as $R_0$. Similarly, $R_2$ is compared with $R_1$ to set the second bit position 706, while $R_3$ is compared with $R_2$ to set the third bit position 708. In general, the K-th bit 710 is set to 1 if $R_K$ is different from $R_{K-1}$, and is set to 0 if $R_K$ is equal to $R_{K-1}$. The bit positions of the transition record 334 are set in a continuously rotating manner, such that after the N-th bit position 712 is set, the next subsequently received region identifier 224 is compared with $R_N$ and again used to set the first bit position 704, so that the transition record 334 preferably represents transition status of the N most recently received region identifiers 224. It will be appreciated that, alternatively, only every M-th received region identifier 224 can be utilized for setting the bits of the transition record 334, where the skip factor M is a predetermined positive integer greater than one.

The number of bits in the transition record 334 that are set to 1 can be used as an indicator of the mobility of the subscriber unit 122. A subscriber unit 122 that is immobile in a coverage region 502–510 can reasonably be expected to receive substantially the same region identifier 224 in every synchronization portion 602 of the outbound protocol 600. Thus, the transition record 334 of an immobile subscriber unit 122 will contain few or no bits set to 1. A subscriber unit 122 moving quickly through several coverage regions preferably will receive several different region identifiers 224 over the time period recorded by the transition record 334. Thus, the transition record 334 of such a highly mobile subscriber unit 122 will contain bits set to 1 for each transition of the region identifier 224 that occurred during the time period recorded by the transition record 334. By merely counting the bits of the transition record 334 that are set to 1, the mobility of the subscriber unit 122 advantageously can be determined.

Figure 8:
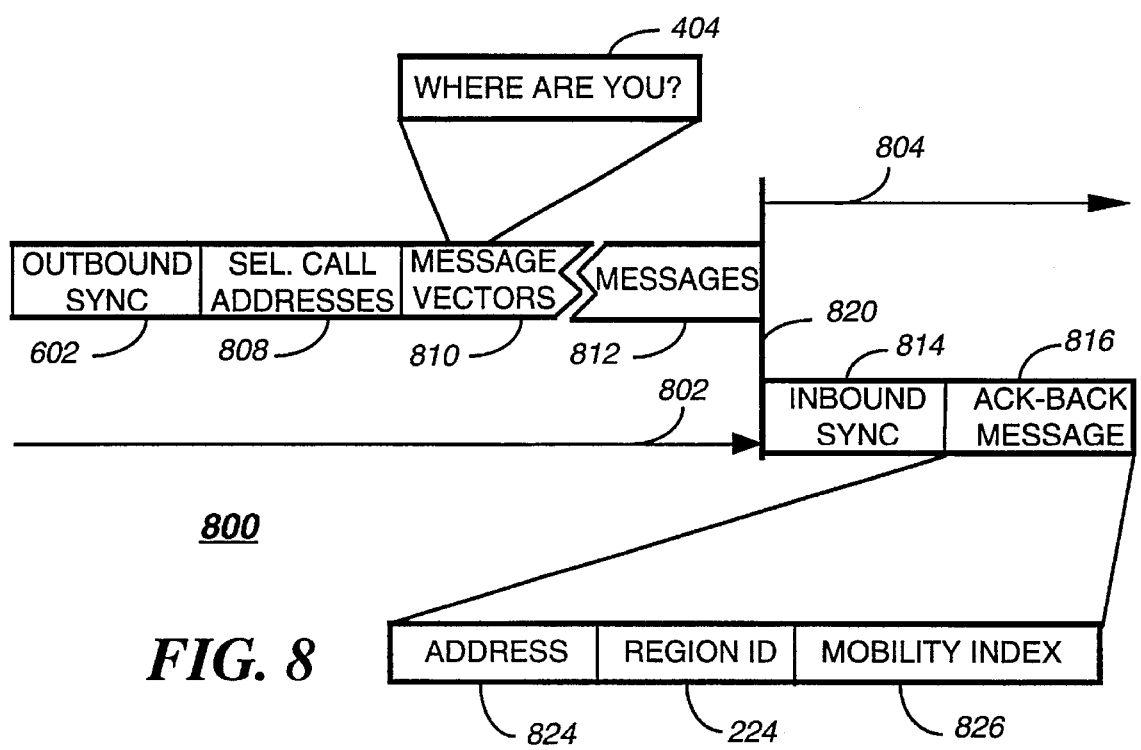
FIG. 8 is a timing diagram of elements of an outbound protocol and an inbound protocol of the fixed and portable portions of the selective call communication system in accordance with the preferred embodiment of the present invention.

Referring to FIG. 8, a timing diagram 800 depicts elements of the outbound protocol 600 and an inbound protocol of the fixed and portable portions 102, 104 of the selective call communication system in accordance with the preferred embodiment of the present invention. The signaling format operating on the outbound and inbound channels preferably operates on a single carrier frequency utilizing well-known time division duplex (TDD) techniques for sharing the frequency. Using TDD transmission the outbound RF channel transmission is depicted as an outbound transmission during a time interval 802, while the inbound RF channel transmission is depicted as an inbound transmission during a time interval 804. The outbound transmission time interval 802 and the inbound transmission time interval 804 are subdivided by a time boundary 820. The time boundary 820 depicts a point in time when the outbound transmissions cease and the inbound transmissions commence. It will be appreciated that, alternatively, FDD techniques can be utilized as well for the outbound and inbound channels.

The elements of the outbound protocol comprise the outbound synchronization portion 602, selective call addresses 808, message vectors 810 and messages 812, while the inbound protocol comprises an inbound synchronization portion 814 and an acknowledge-back message 816. The outbound and inbound synchronization portions 602, 814 are used for synchronizing the receivers 303, 206 using techniques well known in the art. The selective call addresses 808 identify the subscriber units 122 for which the messages 812 are intended. The message vectors 810 point in time within the TDD signal format to the position of the message 812 to be received by each addressed subscriber unit 122. For message notification, the message vector 810 includes the "where are you?" request 404 and the acknowledge-back message 816 comprises an address 824 for identifying the responding subscriber unit 122, and the region identifier 224 for identifying the last received region identifier 224, i.e., the current region identifier 330. In addition, the acknowledge-back message 816 comprises a mobility index value 826, determined as described herein below, for indicating the degree of mobility of the subscriber unit 122 in accordance with the preferred embodiment of the present invention.

The mobility index value 826 is determined from the transition record 334 stored in the subscriber unit 122, preferably by performing a count of the bits of the transition record 334 that are set to a value of 1. To reduce the amount of data required to be transmitted in the acknowledge-back message 816, the mobility index value 826 preferably is represented by a few, e.g., two, bits corresponding to the highest order bits of the count of the 1 bits of the transition record 334. It will be appreciated that, alternatively, the mobility index value 826 can be determined from the count of the 1 bits of the transition record 334 in other ways, such as by a table look-up corresponding to ranges of values of the count, or by using the full count without reducing the number of bits transmitted.

It is possible that different ones of the plurality of portable subscriber units 122 will utilize different values of the skip factor M. It is also possible that different ones of the plurality of portable subscriber units 122 will utilize different values of N (the size of the transition record 334 in bits). It is also possible that a future system will have a different amount of frame time T between transmissions of the synchronization portion 602, which carries the region identifier 224. For these reasons, the mobility index value 826 is preferably normalized in the fixed portion 102 by dividing the mobility index value 826 by the product (M×T×N). By normalizing the mobility index value 826 in this manner, the normalized mobility index value 826 will represent a uniform count of the transitions of the region identifier 224 per unit of time for each of the portable subscriber units, regardless of the values of N, M, and T. It will be appreciated that, alternatively, normalization of the mobility index value 826 can take place in the subscriber unit 122, instead of in the fixed portion 102.

Figure 9:
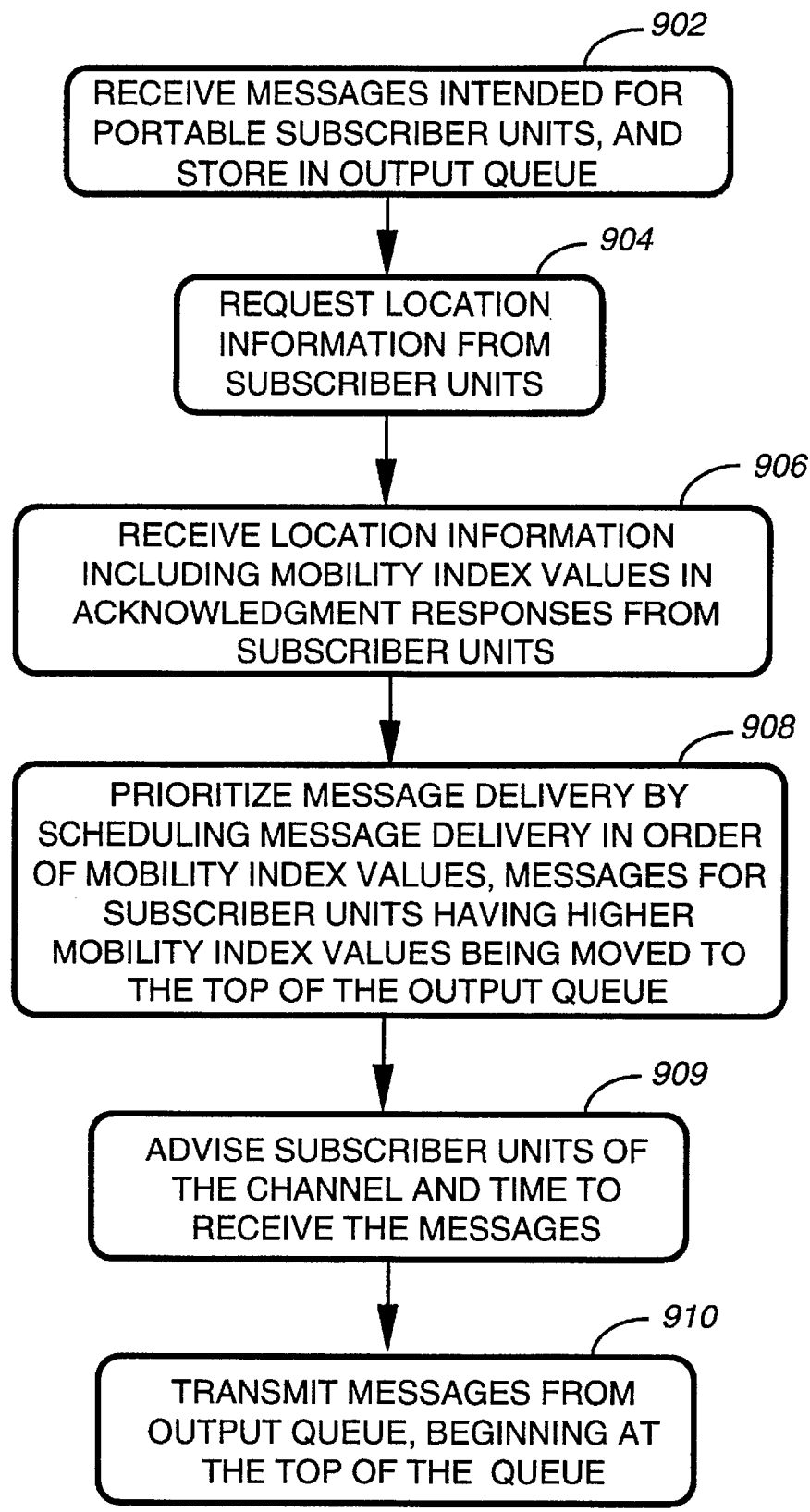
FIG. 9 is a flow chart depicting operation of the fixed portion of the selective call communication system in accor

Referring to FIG. 9, a flow chart 900 depicts operation of the fixed portion 102 of the selective call communication system in accordance with the preferred embodiment of the present invention. In step 902, the processor 212 of the controller 112 receives messages intended for a subset of the portable subscriber units 122 and stores the messages in an output queue in the RAM 210. Then in step 904, the processor 212 uses the transmitter interface 208 to control the transmitter 202 to transmit the "where are you?" request 410 for location information to the subscriber units 122 having messages in the output queue. In step 906, the processor receives and stores in the RAM 210 acknowledgment responses comprising the addresses 824, the location information (region identifier 224) and the mobility index values 826 corresponding to responding ones of the portable subscriber units 122. In step 908, the processor 212 accesses the prioritization element 220 and the scheduler element 222 to prioritize the message delivery by scheduling the message delivery based upon the mobility index value received from each subscriber unit 122 as compared with other mobility index values received from other subscriber units 122. Preferably, the prioritization is done such that messages for the subscriber units 122 which have higher mobility index values will tend to be transmitted before messages for the subscriber units 122 which have lower mobility index values. For example, if the mobility index is a two-bit index capable of the values 0, 1, 2, and 3, then messages for subscriber units 122 having mobility index values of 3 will tend to be scheduled before those for subscriber units having mobility index values of 2, followed by those having 1, followed by those having 0. This is done by moving messages for subscriber units 122 responding with higher mobility index values towards the top of the output queue. In step 909, the processor 212 accesses the transmitter interface 208 and controls the transmitter 202 to transmit commands to the subscriber units 122 regarding the channel and time for receiving the respective messages therefor. In step 910, the processor 212 again accesses the transmitter interface 208 and controls the transmitter 202 to transmit the messages from the output queue, beginning at the top of the queue. In this manner a message intended for a subscriber unit 122 having a higher degree of mobility will tend to be transmitted sooner than in a conventional system, advantageously decreasing the probability that the subscriber units 122 will have sufficient time to move out of the coverage region 502–510 identified in the response to the "where are you?" request 404.

Figure 10:
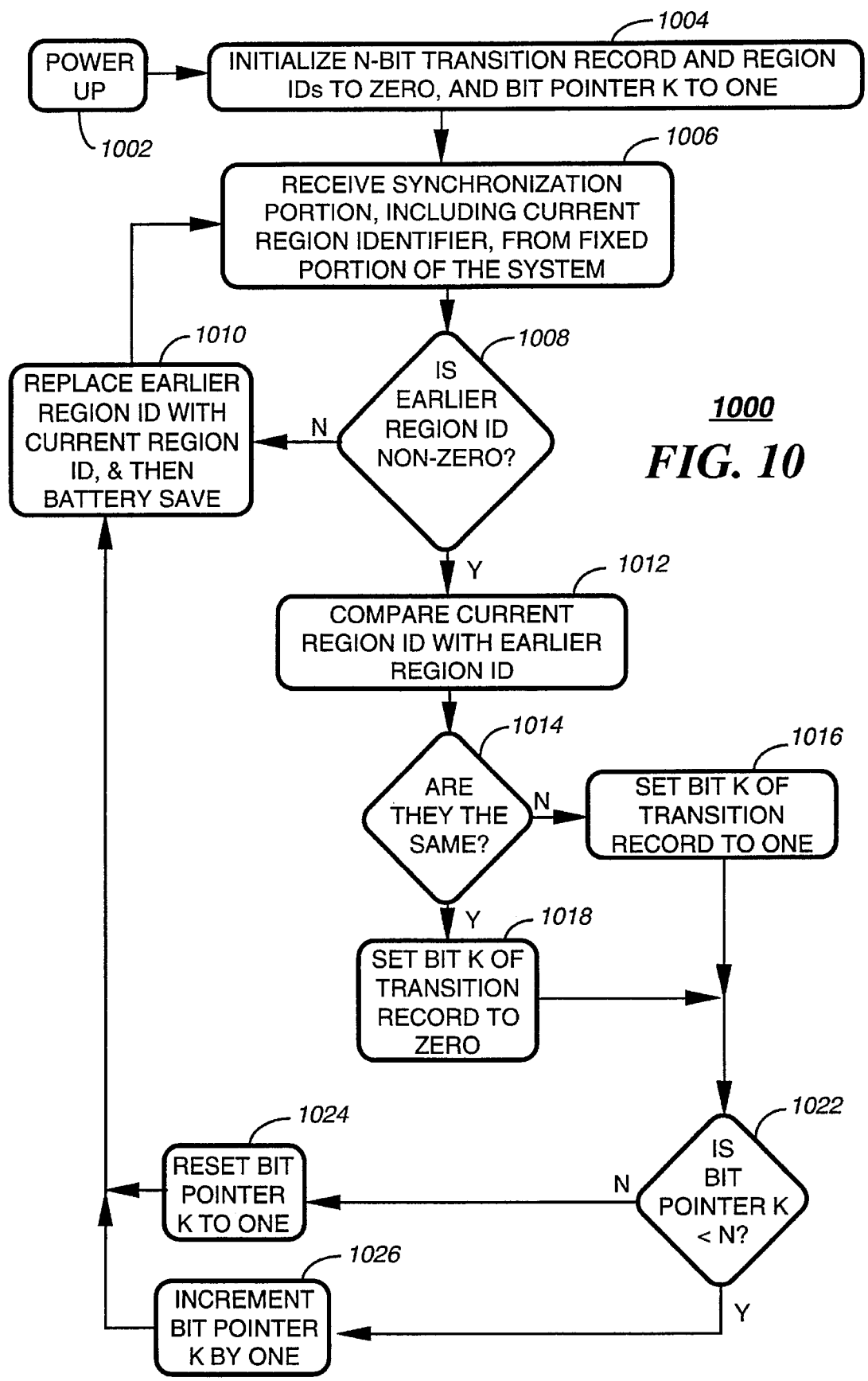
- FIG. 10 is a flow chart depicting operation of the portable subscriber unit in accordance with the preferred embodiment of the present invention.

Referring to FIG. 10, a flow chart 1000 depicts operation of the portable subscriber unit 122 in accordance with the preferred embodiment of the present invention. Following power-up 1002, the microprocessor 308 of the subscriber unit 122 preferably initializes 1004 the N-bit transition record 334 and the current and earlier region identifiers 330, 332 to zero, and a bit pointer K to one. Next, the subscriber unit 122 receives 1006 from the fixed portion 102 one of the synchronization portions 602 of the outbound protocol 600, including the current region identifier 330, which the processor stores in the RAM 322. The microprocessor 308 checks 1008 whether the earlier region identifier 332 is non-zero, indicating that a valid region identifier 224 has been stored since the RAM was initialized in step 1004. If not, the microprocessor 308 replaces 1010 the earlier region identifier 332 with the current region identifier 330, and then puts the subscriber unit into a battery saving mode for a predetermined time while waiting to receive a next one of the synchronization portions 602.

If, on the other hand, in step 1008 the earlier region identifier 332 is non-zero, the microprocessor 308 accesses the comparator element 315 to compare 1012 the current region identifier 330 with the earlier region identifier 332 received during an earlier transmission. If the current region identifier 330 is the same as the earlier region identifier 332, then the microprocessor 308 sets 1018 the K-th bit of the transition record 334 to 0; otherwise, the microprocessor 308 sets 1016 the K-th bit of the transition record 334 to 1. In either case, the microprocessor 308 then checks 1022 whether the bit pointer K is less than N. If so, the microprocessor 308 increments 1026 the bit pointer K by one; otherwise the microprocessor 308 resets 1024 the bit pointer K to one. In either case, the flow then returns to step 1010.

Figure 11:
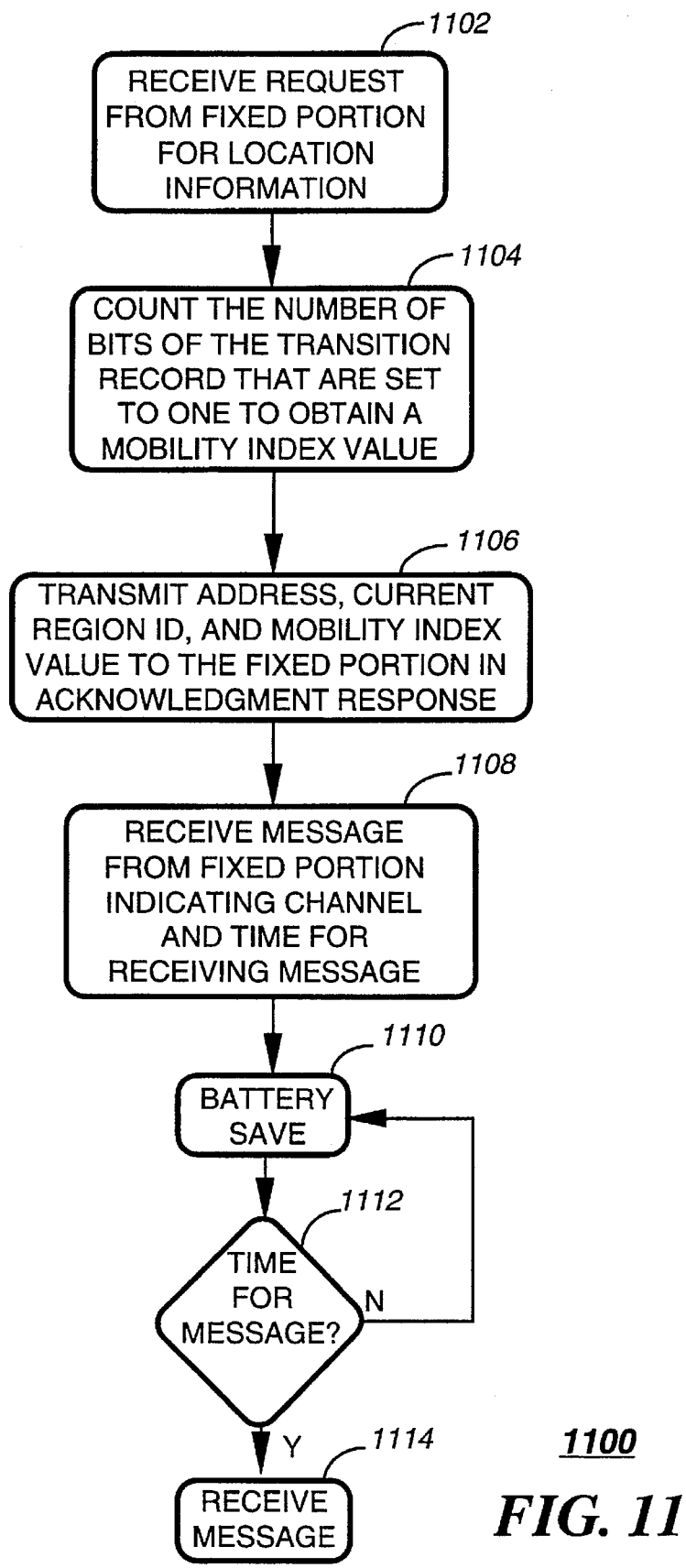
FIG. 11 is a flow chart further depicting operation of the portable subscriber unit in accordance with the preferred embodiment of the present invention.

Referring to FIG. 11, a flow chart 1100 further depicts operation of the portable subscriber unit 122 in accordance with the preferred embodiment of the present invention. In step 1102, the portable subscriber unit 122 receives a "where are you?" request from the fixed portion 102 for location information. In response, the microprocessor 308 counts the number of bits of the transition record 334 that are set to 1 to obtain a mobility index value. To reduce the amount of data required to be transmitted in the acknowledge-back message 816, the mobility index value 826 preferably is represented by a few, e.g., two, bits corresponding to the highest order bits of the count of the 1 bits of the transition record 334. It will be appreciated that, alternatively, the mobility index value 826 can be determined from the count of the 1 bits of the transition record 334 in other ways, such as by a table look-up corresponding to ranges of values of the count, or by using the full count without reducing the number of bits transmitted.

In step 1106 the microprocessor 308 accesses the transceiver 304 to transmit the address 824, the current region identifier 330, and the mobility index value 826 to the fixed portion 102 in the acknowledge-back message 816. Next, the subscriber unit 122 receives 1108 an advisory from the fixed portion 102, indicating the channel and time for receiving the message. In response, the microprocessor 308 places 1110 the subscriber unit 122 into a battery saving mode until determining 1112 that it is time for the message delivery. Then the subscriber unit 122 receives 1114 the message.

Thus it should have become apparent by now that the present invention provides a method and apparatus for prioritizing the communication of messages such that a subscriber unit having a high mobility will be more likely to receive its scheduled messages before moving out of the coverage region in which the subscriber unit was located by the system. The preferred embodiment in accordance with the present invention advantageously provides a simple and inexpensive way for the subscriber units to track and report their various degrees of mobility, based upon transitions of region identifiers simulcast throughout the coverage area.

What is claimed is:

1. A method for prioritizing communications in a two-way communication system serving a plurality of portable subscriber units in a coverage area, the method comprising in a fixed portion of the two-way communication system the steps of:

requesting location information from a subset of the plurality of portable subscriber units in response to having a need to communicate therewith;

receiving the location information from the subset of the plurality of portable subscriber units, the location information including a plurality of mobility index values determined by the subset of the plurality of portable subscriber units for indicating mobility of each portable subscriber unit; and prioritizing the communications based upon the plurality of mobility index values.

2. The method of claim 1, wherein the plurality of mobility index values comprise a range of values indicative of differing amounts of subscriber unit mobility, and wherein the prioritizing step comprises the step of scheduling the communications in an order determined by the plurality of mobility index values, communications with portable subscriber units having mobility index values indicative of higher subscriber unit mobility being scheduled first.

3. The method of claim 1, wherein the coverage area is partitioned into a plurality of coverage regions, a coverage region identified by a region identifier transmitted periodically within the coverage region, and wherein the method further comprises in a portable subscriber unit of the plurality of portable subscriber units the steps of:

receiving over time a plurality of transmissions of the region identifier from the fixed portion; and determining therefrom a mobility index value for the portable subscriber unit, the mobility index value indicative of a rate of change of the region identifier and thus also indicative of subscriber unit mobility.

4. The method of claim 3, further comprising in the portable subscriber unit the step of:

transmitting the mobility index value to the fixed portion of the two-way communication system in response to receiving a request therefrom for the location information.

5. The method of claim 3, wherein the mobility index value is normalized to system variables, such that equal mobility index values represent a constant rate of change of the region identifier per unit of time.

6. The method of claim 3, further comprising in the portable subscriber unit the step of:

comparing the region identifier received in a current transmission of the plurality of transmissions with the region identifier received in an earlier transmission to determine whether a region identifier transition has occurred, the region identifier transition being defined to have occurred whenever the region identifier received in the current transmission is different from the region identifier received in the earlier transmission.

7. The method of claim 6, further comprising in the portable subscriber unit the step of:

maintaining a transition record corresponding to N recently received transmissions of the region identifier, wherein N is a predetermined positive integer, and wherein the transition record includes an indicator corresponding to each of the N recently received transmissions, the indicator selected from a positive indicator for indicating that a region identifier transition has occurred, and a negative indicator for indicating that a region identifier transition has not occurred.

8. The method of claim 7, wherein the mobility index value is determined from a count of positive indicators in the transition record.

9. A controller in a fixed portion of a two-way communication system for prioritizing communications therein, the two-way communication system serving a plurality of portable subscriber units in a coverage area, the controller comprising:

a processor for directing operation of the controller;

a telephone interface coupled to the processor for interfacing the two-way communication system with a telephone system;

a memory coupled to the controller for queuing the communications for the plurality of portable subscriber units;

a transmitter interface coupled to the processor for requesting location information from a subset of the plurality of portable subscriber units in response to having a need to communicate therewith;

a receiver interface coupled to the processor for receiving the location information from the subset of the plurality of portable subscriber units, the location information including a plurality of mobility index values determined by the subset of the plurality of portable subscriber units for indicating mobility of each portable subscriber unit; and a prioritization element coupled to the processor for prioritizing the communications based upon the plurality of mobility index values.

10. The controller of claim 9, wherein the plurality of mobility index values comprise a range of values indicative of differing amounts of subscriber unit mobility, and wherein the prioritization element comprises a scheduler element for scheduling the communications in an order determined by the plurality of mobility index values, communications with portable subscriber units having mobility index values indicative of higher subscriber unit mobility being scheduled first.

11. A portable subscriber unit for use in a two-way communication system for prioritizing communications therein, the portable subscriber unit served in a coverage area partitioned into a plurality of coverage regions, a coverage region identified by a region identifier transmitted periodically within the coverage region, the portable subscriber unit comprising:

a receiver for receiving over time a plurality of transmissions of the region identifier from a fixed portion of the two-way communication system;

a microprocessor coupled to the receiver for decoding the plurality of transmissions of the region identifier and for controlling the portable subscriber unit in response thereto;

a memory coupled to the microprocessor for storing information decoded from the plurality of transmissions of the region identifier;

user controls coupled to the microprocessor for providing control of the portable subscriber unit by a user; and a mobility index determination element coupled to the microprocessor for determining from the plurality of transmissions of the region identifier a mobility index value for the portable subscriber unit, the mobility index value indicative of a rate of change of the region identifier and thus also indicative of subscriber unit mobility.

12. The portable subscriber unit of claim 11, further comprising:

a transmitter coupled to the microprocessor for transmitting the mobility index value to the fixed portion of the two-way communication system in response to receiving a request therefrom for location information.

13. The method of claim 11, wherein the mobility index value is normalized to system variables, such that equal mobility index values represent a constant rate of change of the region identifier per unit of time.

14. The portable subscriber unit of claim 11, further comprising:

a comparator element coupled to the microprocessor for comparing the region identifier received in a current transmission of the plurality of transmissions with the region identifier received in an earlier transmission to determine whether a region identifier transition has occurred, the region identifier transition being defined to have occurred whenever the region identifier received in the current transmission is different from the region identifier received in the earlier transmission.

15. The portable subscriber unit of claim 14, further comprising:

a transition record maintenance element coupled to the microprocessor for maintaining a transition record corresponding to N recently received transmissions of the region identifier, wherein N is a predetermined positive integer, and wherein the transition record includes an indicator corresponding to each of the N recently received transmissions, the indicator selected from a positive indicator for indicating that a region identifier transition has occurred, and a negative indicator for indicating that a region identifier transition has not occurred.

16. The portable subscriber unit of claim 15, wherein the mobility index value determined from a count of positive indicators in the transition record.

* * * * *